(12) United States Patent
Straub, Jr. et al.

(10) Patent No.: US 7,752,919 B2
(45) Date of Patent: Jul. 13, 2010

(54) SYSTEM AND METHOD OF AN ACOUSTIC FLOW METER WITH DUAL FLOW MEASUREMENTS

(75) Inventors: Henry Charles Straub, Jr., Sugar Land, TX (US); Charles W. Derr, Spring, TX (US)

(73) Assignee: Daniel Measurement and Control, Inc., Houston, TX (US)

( * ) Notice: Subject to any disclaimer, the term of this patent is extended or adjusted under 35 U.S.C. 154(b) by 75 days.

(21) Appl. No.: 12/169,685

(22) Filed: Jul. 9, 2008

(65) Prior Publication Data

US 2010/0005900 A1 Jan. 14, 2010

(51) Int. Cl.
*G01F 1/66* (2006.01)
(52) U.S. Cl. ............... 73/861.29; 73/861.31; 73/861.27
(58) Field of Classification Search .................. None
See application file for complete search history.

(56) References Cited

U.S. PATENT DOCUMENTS

| | | | | |
|---|---|---|---|---|
| 2,993,373 A | * | 7/1961 | Kritz | 73/861.27 |
| 3,564,912 A | | 2/1971 | Malone | |
| 3,625,057 A | * | 12/1971 | Yoshiyama et al. | 73/861.27 |
| 3,940,985 A | * | 3/1976 | Wyler | 73/861.31 |
| 4,024,760 A | | 5/1977 | Estrada | |
| 4,102,186 A | * | 7/1978 | Brown | 73/861.27 |
| 4,320,666 A | * | 3/1982 | Redding | 73/861.28 |
| 4,408,589 A | * | 10/1983 | Hauler et al. | 123/494 |
| 4,646,575 A | | 3/1987 | O'Hair | |
| 5,040,415 A | * | 8/1991 | Barkhoudarian | 73/198 |
| 5,228,347 A | * | 7/1993 | Lowell et al. | 73/861.28 |
| 5,369,998 A | * | 12/1994 | Sowerby | 73/861.04 |
| 5,437,194 A | * | 8/1995 | Lynnworth | 73/861.27 |
| 5,597,962 A | * | 1/1997 | Hastings et al. | 73/861.29 |
| 5,962,790 A | | 10/1999 | Lynnworth | |

(Continued)

FOREIGN PATENT DOCUMENTS

JP 55-39035 A 3/1980

(Continued)

OTHER PUBLICATIONS

Gregor Brown, Herb Estrada, Don Augenstein, & Terry Cousins, LNG Allocation Metering Using 8-Path Ultrasonic Meters; 25th North Sea Flow Measurement Workshop—Oct. 16-19, 2007, 23 pp.

(Continued)

*Primary Examiner*—Harshad Patel
(74) *Attorney, Agent, or Firm*—Mark E. Scott; Conley Rose, P.C.

(57) ABSTRACT

Acoustic flow meter with dual flow measurements. At least some of the illustrative embodiments are flow meters comprising a spool piece that defines a central passage, a first plurality of transducer pairs mechanically coupled to the spool piece, a second plurality of transducer pairs mechanically coupled to the spool piece, and meter electronics electrically coupled to the first and second plurality of transducer pairs (the meter electronics configured to determine a first value indicative of fluid flow through the central passage, the first value determined using only signals of the first plurality of transducer pairs). The meter electronics further configured to determine a second value indicative of fluid flow through the central passage, the second value determined using only signals of the second plurality of transducer pairs.

15 Claims, 8 Drawing Sheets

U.S. PATENT DOCUMENTS

| | | | |
|---|---|---|---|
| 6,089,104 A * | 7/2000 | Chang | 73/861.27 |
| 6,435,037 B1 | 8/2002 | Doten | |
| 6,435,038 B1 * | 8/2002 | Nam | 73/861.27 |
| 6,460,419 B2 * | 10/2002 | Su | 73/861.31 |
| 6,550,345 B1 * | 4/2003 | Letton | 73/861.27 |
| 6,595,071 B1 * | 7/2003 | Doten | 73/861.29 |
| 6,732,595 B2 * | 5/2004 | Lynnworth | 73/861.27 |
| 7,151,490 B2 | 12/2006 | Richards | |
| 7,152,490 B1 * | 12/2006 | Freund et al. | 73/861.27 |
| 7,290,455 B2 * | 11/2007 | Groeschel | 73/861.28 |
| 2002/0053243 A1 * | 5/2002 | Su | 73/861.28 |
| 2010/0005900 A1 * | 1/2010 | Straub et al. | 73/861.18 |
| 2010/0005901 A1 * | 1/2010 | Groeschel et al. | 73/861.27 |

FOREIGN PATENT DOCUMENTS

| | | | |
|---|---|---|---|
| JP | 59-104026 U | 7/1984 | |
| JP | 8-304435 A | 11/1996 | |

OTHER PUBLICATIONS

Dr. Volker Herrmann, Mr. John Lansing, Mr. Toralf Dietz & Mr. Steve Caldwell; Investigations of an 8-Path Ultrasound Meter—What Sensitivity to Upstream Disturbances Remain? 6th South East Asia Hydrocarbon Flow Measurement Workshop 2007; 21 pp.

Internationl Search Report for PCT Patent Application No. PCT/US2009/046711 filed Jun. 9, 2009.

International Search Report for PCT Patent Application No. PCT/US2009/046752 filed Jun. 9, 2009.

Notice of Allowance and Fee(s) Due for U.S. Appl. No. 12/169,678—filed Jul. 9, 2008—dated Apr. 13, 2010.

Notice of Allowance and Fee(s) Due for U.S. Appl. No. 12/169,678—filed Jul. 9, 2008—dated Feb. 2, 2010.

* cited by examiner

__US 7,752,919 B2__

SYSTEM AND METHOD OF AN ACOUSTIC FLOW METER WITH DUAL FLOW MEASUREMENTS

CROSS REFERENCE TO RELATED APPLICATIONS

None.

BACKGROUND

After hydrocarbons have been removed from the ground, the fluid stream (e.g., crude oil, natural gas) is transported from place-to-place via pipelines. It is desirable to know with accuracy the amount of fluid flowing in the stream, and particular accuracy is demanded when the fluid is changing hands, or "custody transfer." Ultrasonic flow meters may be used to measure the amount of fluid flowing in a pipeline, and ultrasonic flow meters have sufficient accuracy to be used in custody transfer.

The value of gas "changing hands" at the point of custody transfer in a high volume natural gas pipeline may amount to a million dollars or more in a single day. Thus, in some custody transfer situations a single meter body houses two independent ultrasonic flow meters. The two meters enable redundancy in case one meter fails, and in situations where both flow meters are operational, the accuracy of recorded flow volumes may be verified by comparing the two independent measurements. However, in some situations the meters may read differently even when each meter is operating correctly.

BRIEF DESCRIPTION OF THE DRAWINGS

For a detailed description of exemplary embodiments, reference will now be made to the accompanying drawings in which.

NOTATION AND NOMENCLATURE

Certain terms are used throughout the following description and claims to refer to particular system components. As one skilled in the art will appreciate, meter manufacturing companies may refer to a component by different names. This document does not intend to distinguish between components that differ in name but not function.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices and connections.

"Non-planar" in reference to multiple pairs of transducers (or chords of the respective pairs of transducers) shall mean that the multiple pairs of transducers (or their respective chords) do not reside within the same plane.

"Spool piece" and/or "meter body" shall refer to a component milled from a single casting. A spool piece and/or meter body created from separate castings coupled together (e.g., flange connection, welded) shall not be considered a "spool piece" or "meter body" for purposes of this disclosure and claims.

"Axial position" of a transducer pair (or their respective chord) shall refer to the location of the upstream transducer relative to the central axis of the central passage. Thus, two transducer pairs may be at the same axial position, yet on opposite sides of the spool piece.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment. Further, the various embodiments were developed in the context of measuring hydrocarbon flows (e.g., crude oil, natural gas), and the description follows from the developmental context; however, the systems and methods described are equally applicable to measurement of any fluid flow (e.g., cryogenic substances, water).

Figure 1:
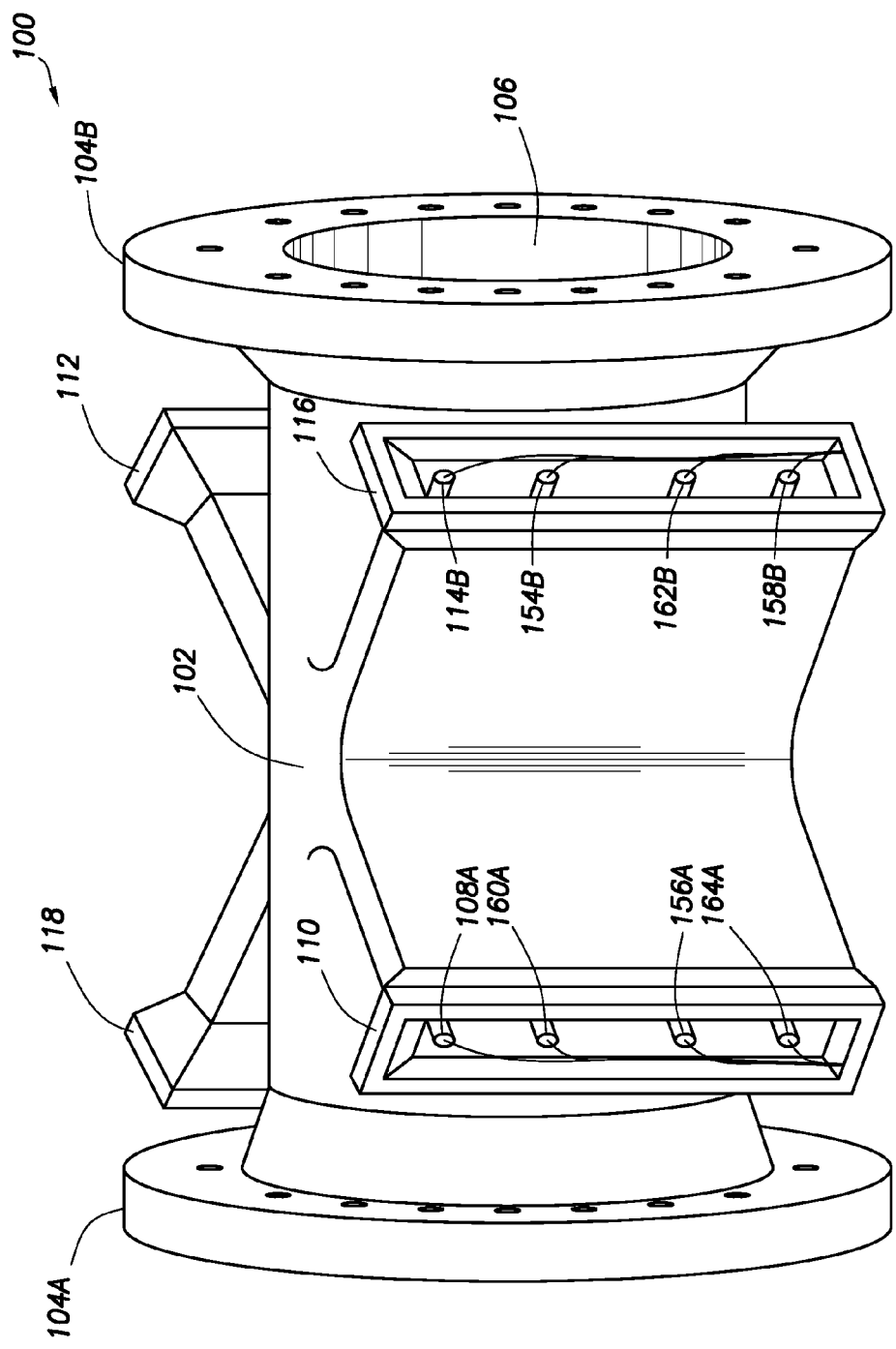
FIG. 1 shows a perspective view of a flow meter in accordance with at least some embodiments.

FIG. 1 illustrates a flow meter 100 comprising a sufficient number of transducer pairs that redundant flow measurements can be made. In particular, the meter body or spool piece 102 is configured for placement between sections of a pipeline, such as by connecting the spool piece 102 to the pipeline by way of the flanges 104A and 104B. The spool piece 102 has a predetermined size and defines a central passage 106 through which measured fluid flows. The flow meter 100 further comprises a plurality of transducer pairs. In the perspective view of FIG. 1, only one transducer of each of the illustrative eight transducer pairs is visible. In particular, transducer 108A in housing 110 is paired with a transducer (not visible) in housing 112. Likewise, the remaining transducers in housing 110 are paired with transducers (not visible) in housing 112. Similarly, transducer 114B in housing 116 is paired with a transducer (not visible) in housing 118.

Likewise, the remaining transducers in housing 116 are paired with transducers (not visible) in housing 118.

Figure 2:
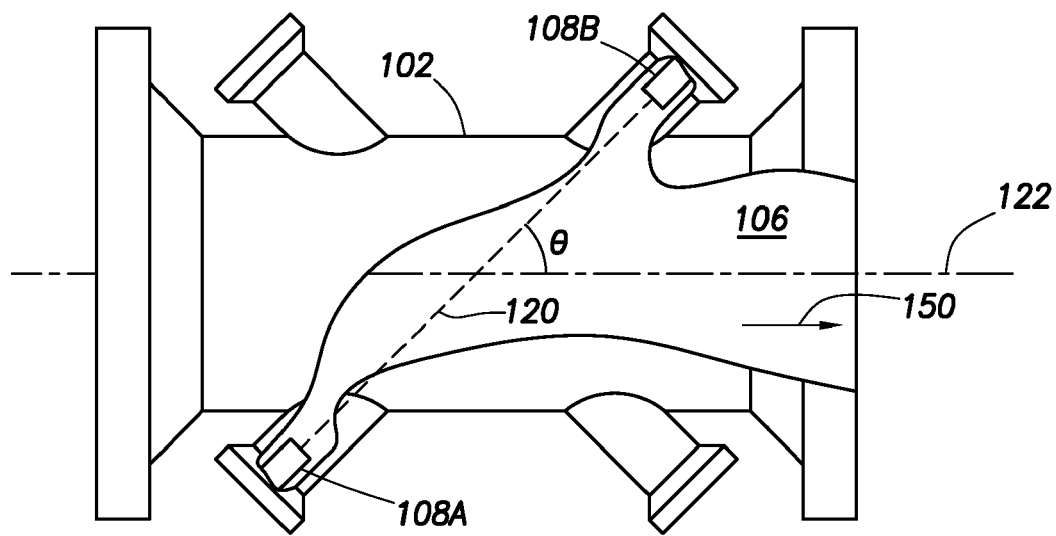
FIG. 2 shows an overhead, partial cut-away view of a flow meter in accordance with at least some embodiments.

FIG. 2 illustrates an overhead partial cut-away view of the system of FIG. 1. In particular, FIG. 2 shows that an illustrative pair of transducers 108A and 108B is located along the length of spool piece 102. Transducers 108A and 108B are acoustic transceivers, and more particularly ultrasonic transceivers, meaning that they both generate and receive acoustic energy having frequencies of above about 20 kilohertz. The acoustic energy is generated and received by a piezoelectric element in each transducer. To generate an acoustic signal, the piezoelectric element is stimulated electrically by way of a sinusoidal signal, and it responds by vibrating. The vibration of the piezoelectric element generates the acoustic signal that travels through the measured fluid in the central passage 106 to the corresponding transducer of the transducer pair. Similarly, upon being struck by acoustic energy (i.e., the acoustic signal and other noise signals), the receiving piezoelectric element vibrates and generates an electrical signal that is detected, digitized, and analyzed by electronics associated with the meter.

A path 120, sometimes referred to as a "chord" or a "chordal pathway", exists between illustrative transducers 108A and 108B at an angle θ to a centerline 122. The length of chord 120 is the distance between the face of transducer 108A and the face of transducer 108B. A fluid (e.g., crude oil, natural gas, liquefied natural gas) flows in a direction 150. Initially, downstream transducer 108B generates an acoustic signal that propagates across the fluid in the spool piece 102, and is then incident upon and detected by upstream transducer 108A. A short time later (e.g., within a few milliseconds), the upstream transducer 108A generates a return acoustic signal that propagates back across the fluid in the spool piece 102, and is then incident upon and detected by the downstream transducer 108B. Thus, illustrative transducers 108A and 108B play "pitch and catch" with acoustic signals along chordal path 120. During operation, this sequence may occur thousands of times per minute.

The transit time of the acoustic signal between transducers 108A and 108B depends in part upon whether the acoustic signal is traveling upstream or downstream with respect to the fluid flow. The transit time for an acoustic signal traveling downstream (i.e., in the same direction as the fluid flow, defined by arrow 150) is less than its transit time when traveling upstream (i.e., against the fluid flow, opposite the direction of arrow 150). The upstream and downstream transit times can be used to calculate the average flow velocity of the gas along and/or proximate to the chord, and the transit times can be used to calculate speed of sound in the measured fluid.

In accordance with the various embodiments, the flow meter 100 performs two separate and independent flow measurements with transducers on the same spool piece. In particular, four of the illustrative eight transducer pairs are associated with a first flow measurement subsystem, and the remaining four of the illustrative eight transducer pairs are associated with a second flow measurement subsystem. In other embodiments, greater or fewer numbers of transducers pairs may be used by each measurement subsystem, and the number of transducers pairs as between the measurement subsystems need not be the same. Regardless of the number transducer pairs used by each measurement subsystem, when each flow measurement subsystem is in operation the separate flow measurements may be compared and thus used to verify fluid flow through the meter. In cases where one flow measurement subsystem is inoperable (e.g., a transducer pair fails), the second flow measurement subsystem may continue to be used for measuring the fluid flow.

Figure 3:
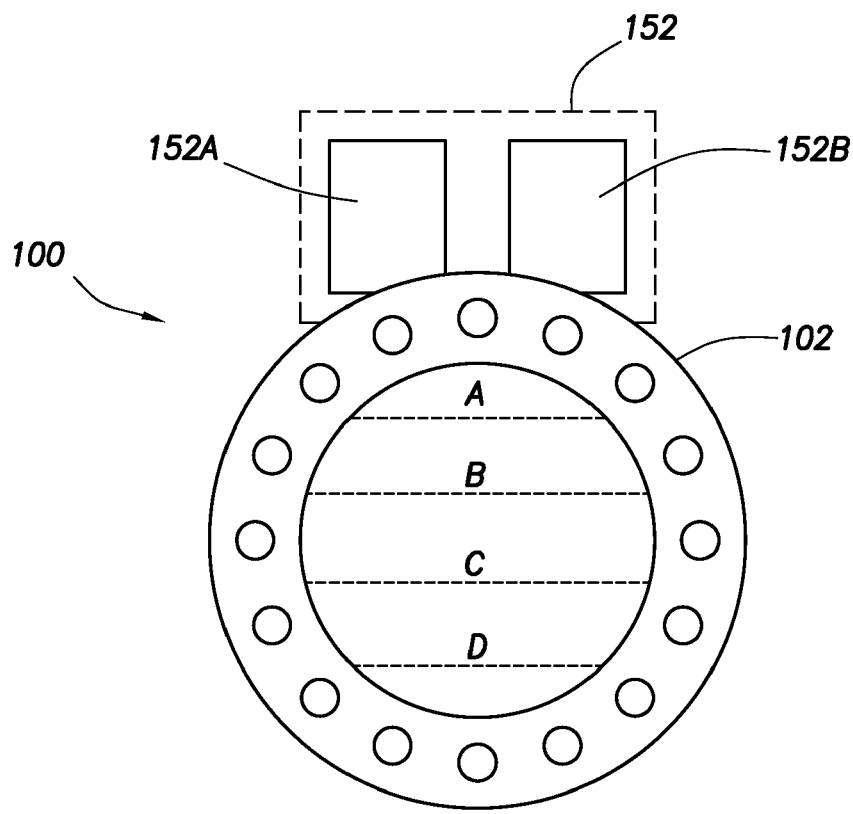
FIG. 3 shows an elevation end view a flow meter, and with respect to a first measurement subsystem, in accordance with at least some embodiments.

FIG. 3 illustrates an elevational end view of one end of the flow meter 100 in relation to a first measurement subsystem. The first flow measurement subsystem of FIG. 3 comprises four chordal pathways A, B, C and D at varying elevations within the spool piece 102. In particular, chord A is an uppermost chord, chord B is an upper-middle chord, chord C is the lower-middle chord, and chord D is the lower-most chord. The elevation designations upper and lower, and the variants, are in reference to gravity. Each chordal pathway A-D corresponds to a transducer pair behaving alternately as a transmitter and receiver. Also shown in FIG. 3 is meter electronics 152 that acquire and process the data from the illustrative four chordal pathways A-D (and possibly others). Hidden from view in FIG. 3, because of the flange, are the four pairs of transducers that correspond to chordal pathways A-D. FIG. 3 shows only the elevational orientation of the illustrative four chords of the first measurement subsystem, and does not speak to whether those chords are parallel or co-planar.

In related art systems having separate flow measurements on a single spool piece, while the transducer pairs may define chords having elevations similar to those of FIG. 3, every chord for a measurement subsystem is co-planar with other chords of the measurement subsystem, and the planes as between the two measurement subsystems form an "X" pattern. The inventors of the present specification have found that co-planar chords for each measurement subsystem result, in some situations, in measurement differences as between the subsystems that are not attributable to errors or faults with the transducers or metering electronics. In particular, the inventors of the present specification have found that cross-flow within the central passage leads to differences in measured flow as between two measurement subsystems even when the subsystems are each working properly. Such differences may lead to discrepancies in total volume, and may result in attempts to diagnose and repair non-existent problems with the flow meter.

Figure 4:
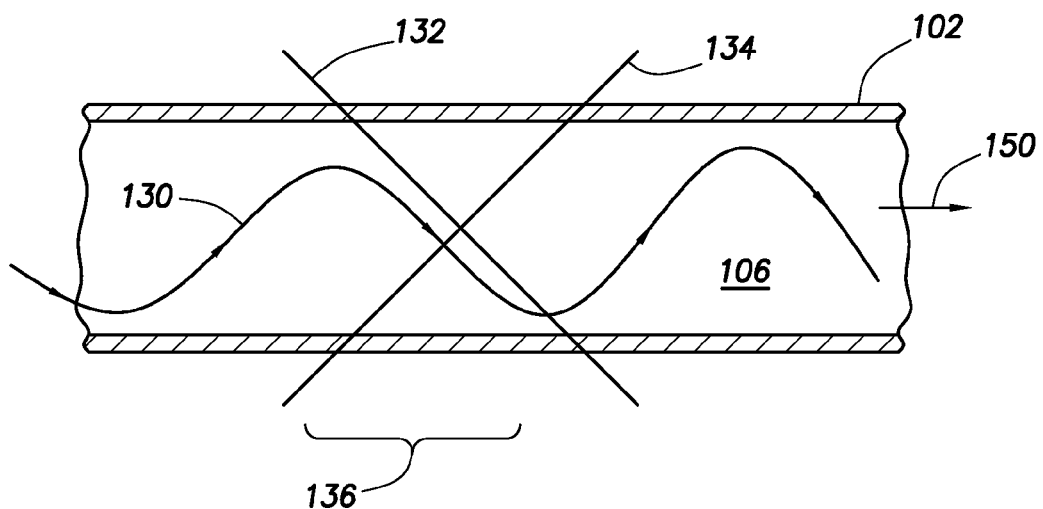
FIG. 4 shows an overhead cross-sectional view a flow meter in accordance with at least some embodiments.

FIG. 4 illustrates an overhead cross-sectional view of a spool piece 102 with a measured fluid flowing therein. While the flow of the fluid is generally in the direction 150, in some situations (e.g., downstream of an elbow or "T" connection) the fluid tends to take a zig-zag pattern through the central passage 106, as illustrated by line 130. The zig-zag pattern is exaggerated for purposes of describing the phenomenon. In the related art, all the transducer pairs for a measurement subsystem are parallel and co-planar. For example, all the transducer pairs for a first measurement subsystem are within a vertical plane, such as the vertical plane 132. The vertical plane 132 is shown as a line because in the view of FIG. 3 the plane extends upward out of the page, and thus the view of FIG. 4 is directly along the plane. All the transducer pairs of a second measurement subsystem are also within a vertical plane, such as vertical plane 134. Here again, vertical plane 134 is shown as a line because in the view of FIG. 4 the plane extends upward out of the page, and thus the view of FIG. 4 is directly along the plane.

When all the chords of a measurement subsystem are co-planar, the chords are particularly sensitive to cross-flow of the measured fluid. For example, the portion of the fluid flow at 136 crosses the central passage approximately parallel to the chords of the first measurement subsystem in vertical plane 132. The chords within plane 132 will measure significantly greater fluid flow than the chords of the second measurement subsystem whose chords are within vertical plane 134 because the flow in illustrative FIG. 3 is almost perpendicular to the vertical plane 134. Thus, even though the first measurement subsystem (with parallel and co-planar chords in vertical plane 132) may be working correctly, and the second measurement subsystem (with parallel and co-planar chords in vertical plane 134) may be working correctly, the two measurement subsystems will measure different fluid flow. Again, the relationship of the flow to the vertical planes 132 and 134 is exaggerated, but nevertheless illustrates the point that in situations where cross-flow is present in the meter, and where the chords of a measurement subsystem are all co-planar, each measurement subsystem is particularly sensitive to cross-flow.

Figure 5:
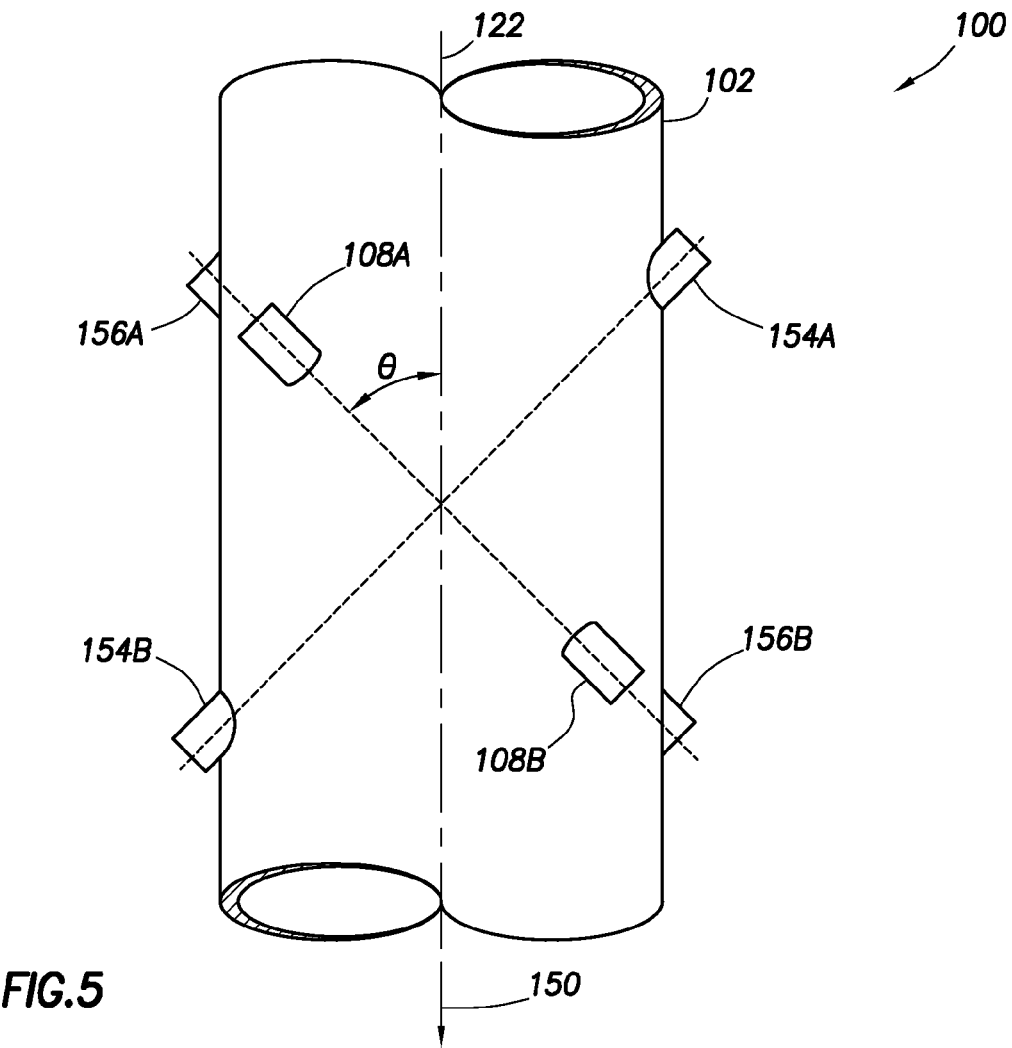
FIG. 5 shows an overhead view of a flow meter, and with respect to a first measurement subsystem, in accordance with at least some embodiments.

FIG. 5 shows an overhead view of the flow meter 100 (with the housings 110, 112, 116 and 118 not shown) to illustrate the relationships of the chords of a first measurement subsystem in accordance with the various embodiments. In particular, a first pair of transducers 108A and 108B (which corresponds to the upper-most chord, chord A) defines a chordal pathway at a non-perpendicular angle θ to centerline 122 of spool piece 102. Another pair of transducers 154A and 154B (which corresponds to upper-middle chord, chord B) defines a chordal pathway that loosely forms the shape of an "X" with respect to the chordal pathway of transducers 108A and 108B, and in some embodiments the chordal pathway for transducers 154A and 154B is perpendicular to the chordal pathway for transducers 108A and 108B. Similarly, a third pair of transducer 156A and 156B (which corresponds to the lower-middle chord, chord C) defines a chordal pathway parallel to the chordal pathway for transducers 108A and 108B, but lower in the central passage than the chordal pathway for either transducers 108A and 108B or transducers 154A and 154B. Not explicitly shown in FIG. 4, because of the curvature of the illustrative spool piece 102, is a fourth pair of transducers 158 (transducer 158B shown in FIG. 1) (which corresponds to the lower-most chord, chord D) defines a chordal pathway parallel to the chordal pathway for transducer ports 154A and 154B.

Taking FIGS. 3 and 5 together, for the first measurement subsystem the pairs of transducers are arranged such that the upper two pairs of transducers corresponding to chords A and B form an the shape of an "X", and the lower two pairs of transducers corresponding to chords C and D also form the shape of an "X". Chords A and B are non-planar, chords C and D are non-planar, chords A and C are parallel, and chords B and D are parallel. The first measurement subsystem determines the velocity of the gas proximate to each chord A-D to obtain chordal flow velocities, and the chordal flow velocities are combined to determine an average flow velocity across the entire central passage. From the average flow velocity and the cross-sectional area of the central passage, the amount of gas flowing in the spool piece, and thus the pipeline, may be determined by the first measurement system. Because the chords of the first measurement subsystem form an "X", the effect of cross-flow on the flow measurement is reduced as the effect cancels or averages out.

Figure 6:
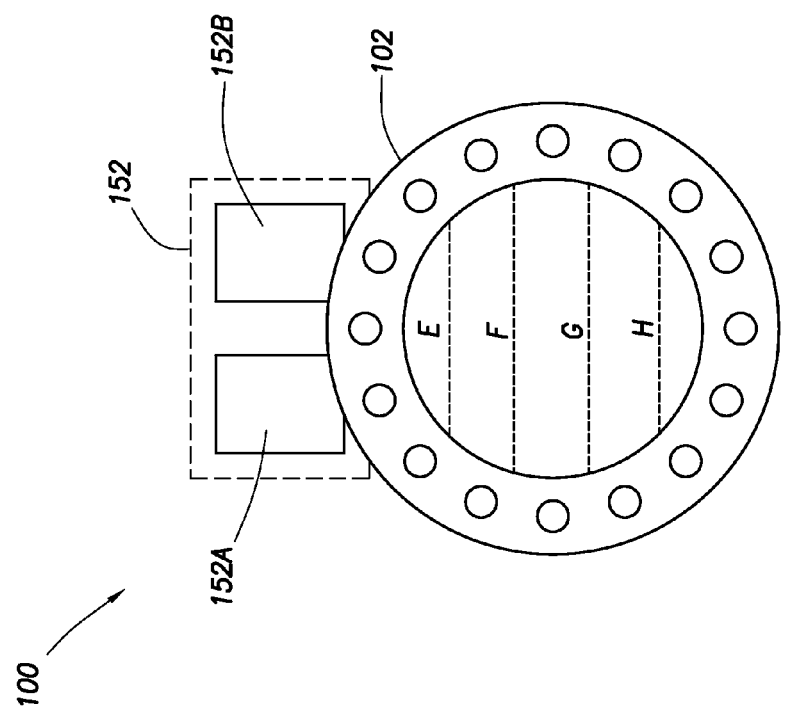
FIG. 6 shows an elevation end view a flow meter, and with respect to a second measurement subsystem, in accordance with at least some embodiments.

Turning now to the second measurement subsystem, FIG. 6 illustrates an elevational end view of one end of the flow meter 100 in relation to a second measurement subsystem. The flow measurement subsystem of FIG. 6 comprises four chordal pathways E, F G and H at varying elevations within the spool piece 102. In particular, chord E is an upper-most chord, chord F is an upper-middle chord, chord G is the lower-middle chord, and chord H is the lower-most chord. Each chordal path E-H corresponds to a transducer pair behaving alternately as a transmitter and receiver. Also shown in FIG. 6 is meter electronics 152 that acquire and process the data from the illustrative four chordal pathways E-H (and possibly others). Hidden from view in FIG. 5, because of the flange, are the four pairs of transducers that correspond to chordal pathways E-H. In accordance with at least some embodiments, the chords E-H are at the same elevations as chords A-D, respectively, while in other embodiments some or all of the chords E-H may be at different elevations than chords A-D. Moreover, FIG. 6 shows only the elevational orientation of the illustrative four chords of the second measurement subsystem, and does not speak to whether those chords are parallel or co-planar.

Figure 7:
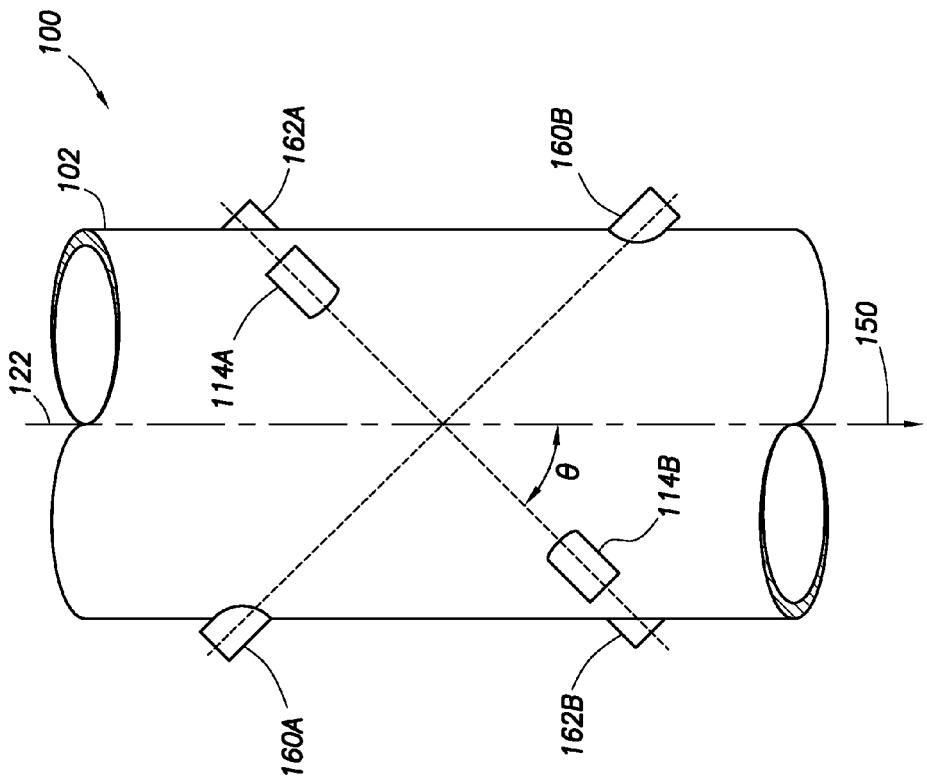
FIG. 7 shows an overhead view of a flow meter, and with respect to a second measurement subsystem, in accordance with at least some embodiments.

FIG. 7 shows an overhead view of the flow meter 100 (with the housings 110, 112, 116 and 118 not shown) to illustrate another aspect of the relationship of the chordal pathways used for the second flow measurement subsystem. In particular, a first pair of transducers 114A and 114B (which corresponds to the upper-most chord, chord E) defines a chrodal pathway at a non-perpendicular angle θ to centerline 122 of spool piece 102. Another pair of transducers 160A and 160B (which corresponds to upper-middle chord, chord F) defines a chordal pathway that loosely forms the shape of an "X" with respect to the chordal pathway of transducers 114A and 114B. Similarly, a third pair of transducer 162A and 162B (which corresponds to the lower-middle chord, chord G) defines a chordal pathway parallel to the chordal pathway for transducers 114A and 114B, but lower in the central passage than the chordal pathway for either transducers 114A and 114B or transducers 160A and 160B. Not explicitly shown in FIG. 6, because of the curvature of the illustrative spool piece 102, is a fourth pair of transducers 164 (transducer 164A shown in FIG. 1) (which corresponds to the lower-most chord, chord H) that defines a chordal pathway parallel to the chordal pathway for transducer ports 160A and 160B.

Taking FIGS. 6 and 7 together, for the second measurement subsystem the pairs of transducers are arranged such that the upper two pairs of transducers corresponding to chords E and F form an the shape of an "X", and the lower two pairs of transducers corresponding to chords G and H also form the shape of an "X". Chords E and F are non-planar, chords G and H are non-planar, chords E and G are parallel, and chords F and H are parallel. The second measurement subsystem determines the velocity of the gas proximate to each chord E-H to obtain chordal flow velocities, and the chordal flow velocities are combined to determine an average flow velocity across the entire central passage. From the average flow velocity and the cross-sectional area of the central passage, the amount of fluid flowing in the spool piece, and thus the pipeline, may be determined by the second measurement subsystem.

Figure 8:
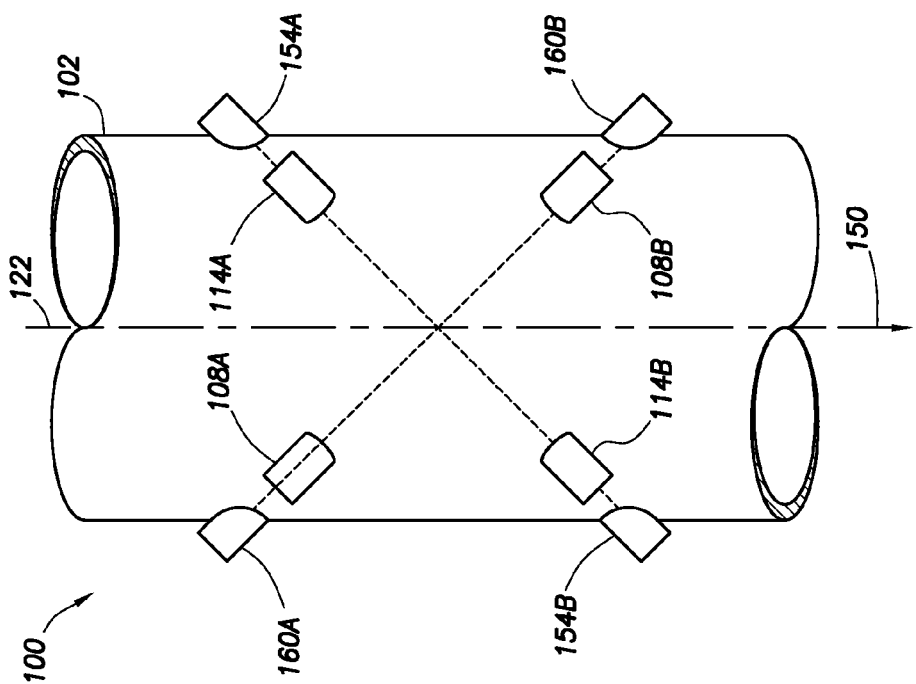
FIG. 8 shows an overhead view of a flow meter in accordance with at least some embodiments.

FIGS. 5 and 7 only show transducers associated with the measurement subsystem being described. FIG. 8 shows an overhead view of the flow meter 100 (with the housings 110, 112, 116 and 118 not shown) to illustrate the relationship of at least some the transducer pairs as between measurement subsystems, and in accordance with at least some embodiments. In particular, the first measurement subsystem comprises transducer pair 108A and 108B, transducer pair 154A and 154B, and two other pairs not visible in FIG. 8. The second measurement subsystem comprises transducer pair 114A and 114B, transducer pair 160A and 160B, and two other pairs not visible in FIG. 8. Thus, in the embodiments shown in FIG. 8, the transducer pairs corresponding to the upper-most chords (chord A for the first measurement subsystem and E for the second measurement subsystem), are at the same axial position of the spool piece 102. Likewise, the transducer pairs corresponding to the upper-middle chords (chord B for the first measurement subsystem and F for the second measurement subsystem), are at the same axial position of the spool piece 102. In at least some embodiments where the axial position of transducer pairs are the substantially the same, and where chords have corresponding elevation (e.g., chords A and E), one or more chords from each measurement subsystem may intersect within the central passage.

Figure 9:
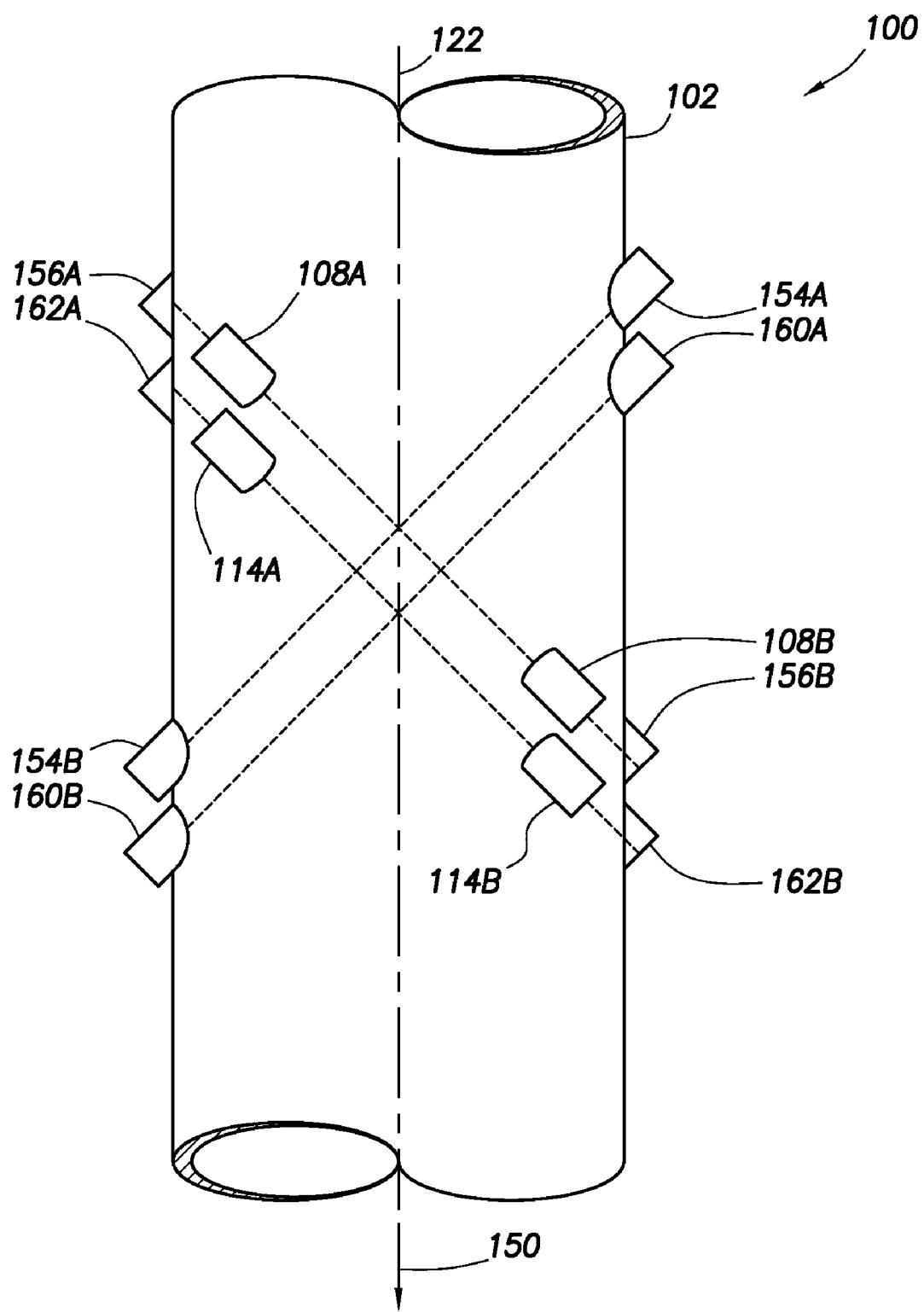
FIG. 9 shows an overhead view of a flow meter in accordance with alternative embodiments.

FIG. 9 shows an overhead view of the flow meter 100 (with the housings 110, 112, 116 and 118 not shown) to illustrate a relationship of at least some transducer pairs in accordance with alternative embodiments. In particular, in the embodiments of FIG. 9 corresponding chords as between the measurement subsystems (e.g., B and F) may have the same elevation relative to the central passage, but the transducer pairs as between the measurement subsystems have different axial positions. For example, the transducer pair 108A and 108B (corresponding to chord A) is positioned on the spool piece 102 at an axial position upstream from the transducer pair 114A and 114B (corresponding to chord E). The same is true for the other transducer pairs illustrated in FIG. 9. Moreover, FIG. 9 illustrates that corresponding transducer pairs need not be on opposite sides of the spool piece 102. Consider again transducer pair 108A and 108B, and transducer pair 114A and 114B. The upstream transducers 108A and 114A are shown on the same side of the spool piece 102, where in previously discussed embodiments the transducers were placed on opposite sides of the spool piece 102.

Figure 10:
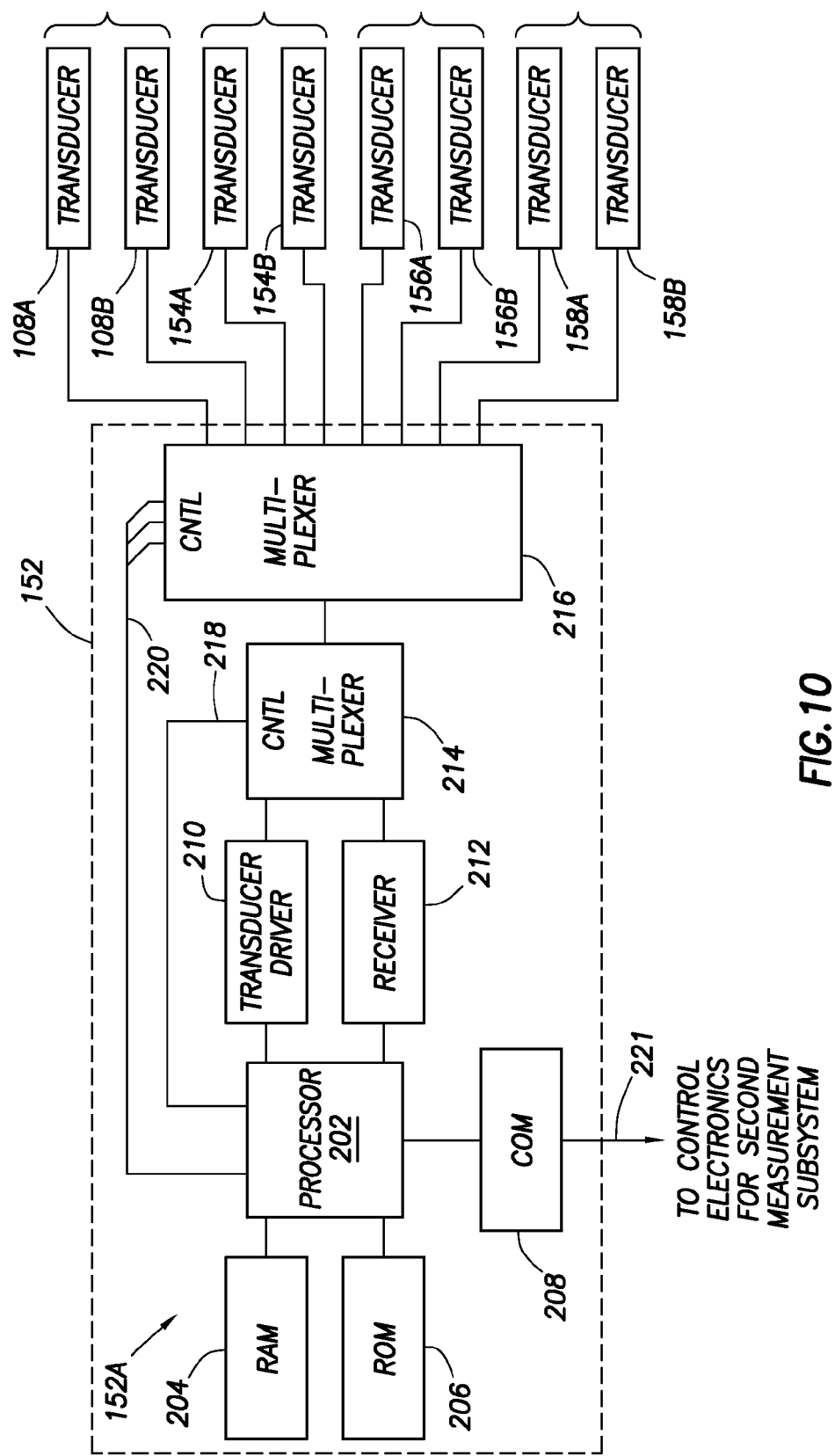
FIG. 10 shows a meter electronics in accordance with at least some embodiments.

The specification now turns to meter electronics. In accordance with some embodiments, each measurement subsystem has a separate and independent set of control electronics. Returning briefly to FIGS. 3 and 6, the overall meter electronics 152 in those figures is illustrated as two separate control electronics 152A and 152B. FIG. 10 illustrates control electronics 152A associated with a single measurement subsystem. It will be understood, however, that in embodiments where each measurement subsystem has a separate and independent set of control electronics, the description in reference to FIG. 10 is equally applicable to the control electronics for each measurement subsystem. The control electronics 152A may reside with an electronics enclosure, which electronics enclosure may couple to the spool piece 102. Alternatively, the electronics enclosure that houses the control electronics 152A may be equivalently mounted proximate (i.e., within a few feet) of the spool piece. The control electronics 152A comprise a processor 202 coupled to a random access memory (RAM) 204, read only memory (ROM) 206 and a communication port (COM) 208. The processor 202 is the device within which programs execute to perform measurement of fluid flow through central passage for the particular measurement subsystem. The ROM 206 is a non-volatile memory which stores operating system programs, as well as programs to implement measuring fluid flow. The RAM 204 is the working memory for the processor 202, and before execution some programs and/or data structures may be copied from the ROM 206 to the RAM 204. In alternative embodiments, programs and data structures may be accessed directly from the ROM 206. The communication port 208 is the mechanism by which the meter communicates with other devices, such as the control electronics associated with the other measurement subsystems of the flow meter, flow computers (which may accumulate measured flow volumes from a plurality of flow meters) and/or a data acquisition system. While the processor 202, RAM 204, ROM 206 and communication port 208 are illustrated as individual devices, in alternative embodiments microcontrollers are used, which microcontrollers integrally comprise a processing core, RAM, ROM and communication ports.

Processor 202 further couples to and controls a plurality of devices in order to send and receive acoustic signals through the measured fluid. In particular, the processor 202 couples to a transducer driver 210, receiver 212, and two multiplexers 214 and 216 by way of control lines 218 and 220, respectively.

In some embodiments, the transducer driver 210 comprises an oscillator circuit and an amplifier circuit. In embodiments in which the transducer driver 210 has an internal oscillator, the transducer driver 210 creates an initial signal, amplifies the signal to sufficient signal strength to drive a transducer, and provides impedance matching with respect to the transducers. In other embodiments, the transducer driver receives an alternating current (AC) signal of the desired frequency from the processor 202, amplifies the signal and provides impedance matching with respect to the transducers. The receiver 212 likewise may take many forms. In some embodiments, the receiver 212 is an analog-to-digital converter which takes the analog waveform created by a transducer representative of the received acoustic energy, and converts the signal to digital form. In some cases, the receiver 212 may filter and/or amplify the signals prior to or after digitization. The digitized version of the received signal may then pass to the processor 202 for purposes of determining fluid flow.

The processor 202, executing a program, selectively controls the multiplexers 214 and 216 to couple each transducer of each transducer pair to the transducer driver 210 (to drive the transducer to create the acoustic signal) and to the receiver 212 (to receive the electrical signal created by the transducer in response to the acoustic energy). In some embodiments, the processor 202, within the span of an illustrative one second measurement period, directs each transducer pair to send approximately 30 upstream acoustic signals and 30 downstream acoustic signals. Greater or fewer sets of upstream and downstream acoustic signals for each transducer pair, and longer or shorter measurement periods, may be equivalently used.

Still referring to FIG. 10, and focusing particularly on transducer pair 108A and 108B as representative of all the transducer pairs. For purposes of this discussion, transducer 108A is the sending transducer, and transducer 108B is the receiving transducer; however, in actual operation these roles change alternately. Under control of the processor 202, the transducer driver 210 is coupled, through multiplexers 214 and 216, to the transducer 108A. An electrical signal generated and/or amplified by the transducer driver 210 propagates to and excites a piezoelectric element in transducer 108A, and in turn transducer 108A generates an acoustic signal. The acoustic signal traverses the distance between transducer 108A and transducer 108B in the measured fluid. For convenience of the drawing, the transducer pair 108A and 108B is not aligned, but in operation the transducer pair would be substantially coaxial, as illustrated in FIG. 5. During the flight time of the acoustic signal between transducer 108A and transducer 108B, the processor 202 changes the configuration of the multiplexers 214 and 216 to couple transducer 108B to the receiver 212. Transducer 108B receives the acoustic energy (i.e., acoustic signal and noise signals), and an electrical signal corresponding to the received acoustic energy propagates to the receiver 212. The roles of transmitter and receiver are thereafter reversed, and based on the difference of transit times (for one or more pairs of firings), a fluid flow velocity proximate to the chord corresponding to transducer pair 108A and 108B is determined. Based on the fluid flow velocity proximate to each chord, the processor 202 determines a flow velocity of the fluid in the central passage, and based on the cross-sectional area of the central passage, the processor calculates a flow volume through the meter over the measurement period. Inasmuch as the control electronic 152A couple only to transducer pairs of the first measurement subsystem, it follows that the control electronics 152A calculate the flow volume, or value indicative of flow volume, using only transducer pairs of the first measurement subsystem.

Again, in embodiments having separate and independent control electronics, the description with respect to FIG. 10, though in reference to the first measurement subsystem, is equally applicable to the second measurement subsystem. Moreover, separate and independent electronics enable one measurement subsystem to remain operational when the second measurement subsystem is inoperable (e.g., control electronics inoperable, failed transducer pair). As alluded to above, and as indicated by line 221, by way of respective COM ports 208, the control electronics may exchange values proportional to measured fluid flow, and when the values are different (e.g., by a predetermined threshold), one or both control electronics may assert an alarm condition. Asserting an alarm condition may involve changing a contact position on a digital output, turning on a light emitting diode (LED) or other light emitting device, or sending a message indicating the alarm condition through the COM port 208 to other devices, such as supervisory control and data acquisition (SCADA) system.

Figure 11:
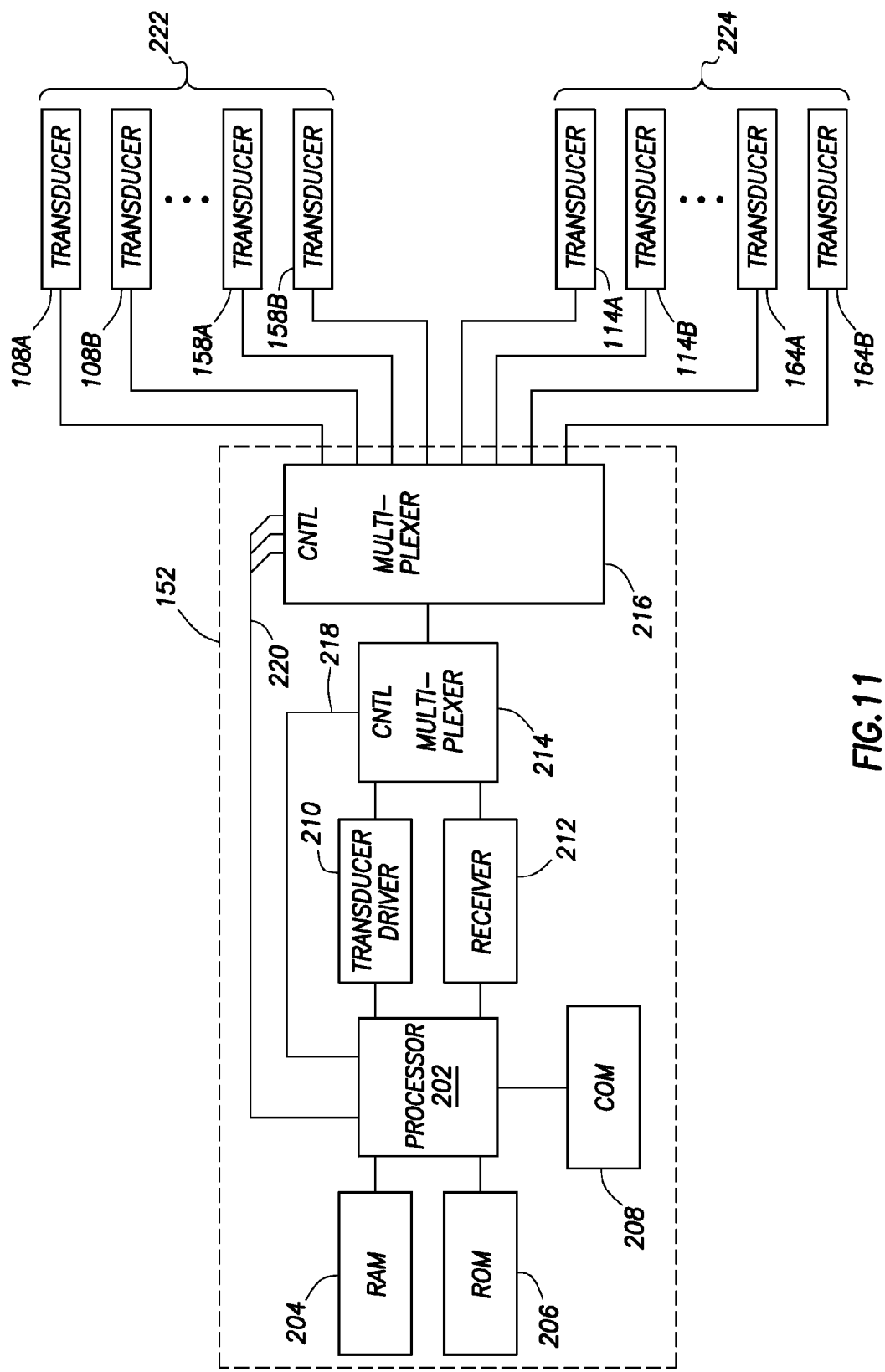
FIG. 11 shows a meter electronics in accordance with alternative embodiments.

FIG. 11 illustrates meter electronics 152 in accordance with alternative embodiments. In particular, in these embodiments a single set of control electronics 152 couples to both the transducer pairs 222 for first measurement subsystem and the transducer pairs 224 for the second measurement subsystem. In the embodiments illustrated in FIG. 11, the processor 202 calculates a first value indicative of fluid flow through the meter using only the transducer pairs 222 of the first measurement subsystem. The processor 202 also calculates a second value indicative of fluid flow through the meter using only the transducer pairs 224 of the second measurement subsystem. The processor 202 may then compare the values, and indicate an alarm condition if the two values are different by a predetermined value. Moreover, the processor 202 and related electronics may continue to calculate a value indicative of the fluid flow using transducer pairs of one measurement subsystem when one or more of the transducers of the second measurement subsystem are inoperable. In yet still other embodiments, the processor 202 may refrain from comparing the two values calculated, and instead may send the two values to other devices (e.g., a flow computer, a SCADA system) for comparison by way of the COM port 208.

Figure 12:
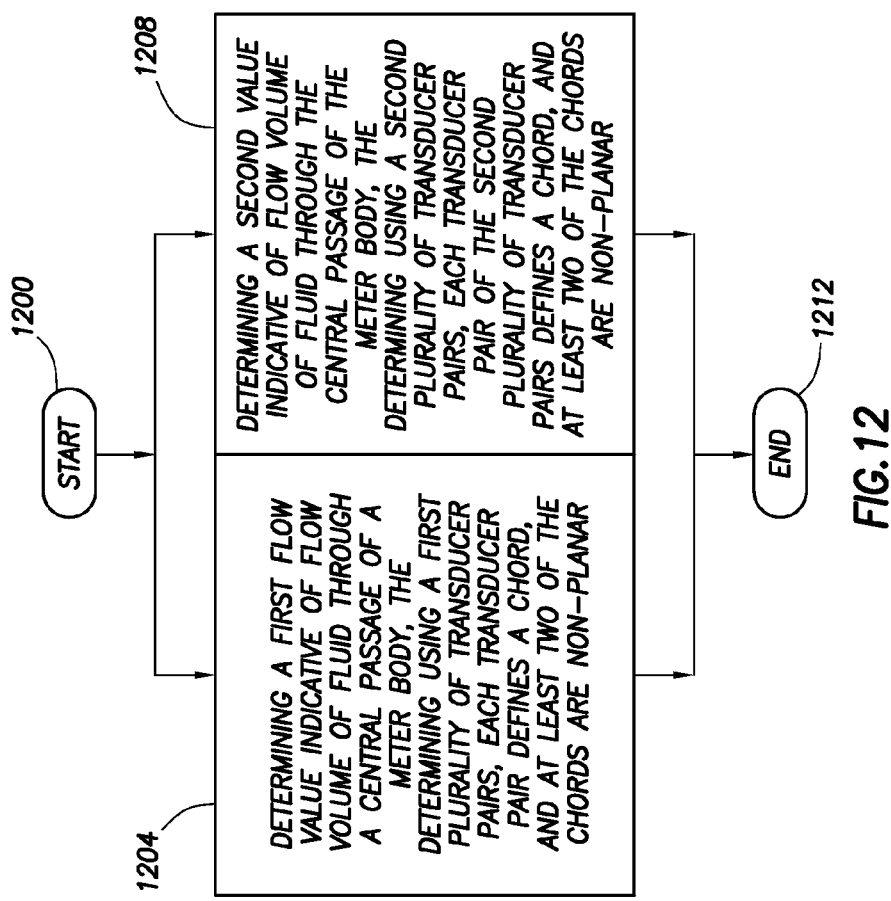
FIG. 12 shows a method in accordance with at least some embodiments.

FIG. 12 illustrates a method in accordance with at least some embodiments. In particular, the method starts (block 1200) and proceeds to determining a first value indicative of flow volume of fluid through a central passage of a meter body (the determining using a first plurality of transducer pairs, each transducer pair defines a chord, and at least two of the chords are non-planar) (block 1204). Substantially concurrently with determining the first value, the method further comprises determining a second value indicative of flow volume of fluid through the central passage of the meter body (the determining using a second plurality of transducer pairs, each transducer pair of the second plurality of transducer pairs defines a chord, and at least two of the chords are non-planar) (block 1208), and the method ends (block 1212).

From the description provided herein, those skilled in the art are readily able to combine software created as described with appropriate general-purpose or special-purpose computer hardware to create a computer system and/or computer subcomponents in accordance with the various embodiments, to create a computer system and/or computer subcomponents for carrying out the methods of the various embodiments, and/or to create a computer-readable media for storing a software program to implement the method aspects of the various embodiments.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A flow meter comprising:
    a spool piece that defines a central passage;
    a first plurality of transducer pairs mechanically coupled to the spool piece, each transducer pair defines a chord across the central passage, each transducer pair configured to propagate and receive acoustic signals along respective chords, and at least two chords of the first plurality of transducers pairs are non-planar;
    a second plurality of transducer pairs mechanically coupled to the spool piece, each transducer pair defines a chord across the central passage, each transducer pair configured to propagate and receive acoustic signals along respective chords, and at least two chords of the second plurality of transducers pairs are non-planar; and
    meter electronics electrically coupled to the first and second plurality of transducer pairs, the meter electronics configured to determine a first value indicative of fluid flow through the central passage, the first value determined using only signals of the first plurality of transducer pairs; and
    the meter electronics further configured to determine a second value indicative of fluid flow through the central passage, the second value determined using only signals of the second plurality of transducer pairs.

2. The flow meter of claim 1 further comprising:
    the first plurality of transducer pairs further comprises:
        a pair of transducers that define a first chord across the central passage at a first elevation in the central passage;
        a pair of transducers that define a second chord across the central passage at a second elevation in the central passage different than the first elevation;
    the second plurality of transducer pairs further comprises:
        a pair of transducers that define a third chord across the central passage at the first elevation;
        a pair of transducers that define a fourth chord across the central passage at the second elevation.

3. The flow meter of claim 2 wherein the first chord and third chord intersect within the central passage.

4. The flow meter of claim 1 further comprising:
    the first plurality of transducer pairs further comprises:
        a first pair of transducers that define a first chord across the central passage at an upper elevation in the central passage;
        a second pair of transducers that define a second chord across the central passage at an upper-middle elevation in the central passage, the second chord and the first chord non-planar;
        a third pair of transducers that define a third chord across the central passage at a lower-middle elevation in the central passage, the third chord parallel to the first chord; and
        a fourth pair of transducers that define a fourth chord across the central passage at a lower elevation in the central passage, the fourth chord parallel to the second chord;
    the second plurality of transducer pairs further comprises:

a fifth pair of transducers that define a fifth chord across the central passage at an upper elevation in the central passage;

a sixth pair of transducers that define a sixth chord across the central passage at an upper-middle elevation in the central passage, the fifth chord and the sixth chord non-planar;

a seventh pair of transducers that define a seventh chord across the central passage at a lower-middle elevation in the central passage, the seventh chord parallel to the fifth chord; and a eighth pair of transducers that define a eighth chord across the central passage at a lower elevation in the central passage, the eight chord parallel to the sixth chord.

5. The flow meter of claim 4 further comprising at least one selected from the group consisting of: the first chord and fifth chord are at substantially the same elevation; the second chord and the sixth chord are at substantially the same elevation; the third chord and the seventh chord are at substantially the same elevation; and the fourth chord and the eighth chord are at substantially the same elevation.

6. The flow meter of claim 4 further comprising at least one selected from the group consisting of: the first pair of transducers and fifth pair of transducers are at substantially the same axial position; the second pair of transducers and the sixth pair of transducers are at substantially the same axial position; the third pair of transducers and the seventh pair of transducers are at substantially the same axial position; and the fourth pair of transducers and the eighth pair of transducers are at substantially the same axial position.

7. The flow meter of claim 1 wherein the meter electronics further comprises:
a first meter electronics electrically coupled to the first plurality of transducers pairs, the first meter electronics configured to determine the first value indicative of fluid flow through the central passage; and
a second meter electronics electrically coupled to the second plurality of transducers pairs, the second meter electronics configured to determine the second value indicative of fluid flow through the central passage;
the first meter electronics configured to continue to operate when the second meter electronics is inoperable.

8. A method comprising:
determining a first value indicative of flow volume of fluid through a central passage of a meter body, the determining using a first plurality of transducer pairs, each transducer pair defines a chord, and at least two of the chords are non-planar; and substantially concurrently
determining a second value indicative of flow volume of fluid through the central passage of the meter body, the determining using a second plurality of transducer pairs, each transducer pair of the second plurality of transducer pairs defines a chord, and at least two of the chords are non-planar.

9. The method of claim 8 wherein determining the first value indicative of flow volume further comprises determining using four transducer pairs, two transducer pairs define a first set of parallel chords, two pairs of transducers define a second set of parallel chords, and the first set of parallel chords and the second set of parallel chords are non-planar.

10. The method of claim 9 wherein determining the second value indicative of flow volume further comprises determining using four transducer pairs, two transducer pairs define a third set of parallel chords, two pairs of transducers define a fourth set of parallel chords, and the third set of parallel chords and the fourths set of parallel chords are non-planar.

11. The method of claim 8 further comprising:
wherein determining the first value indicative of flow volume further comprises determining by a first meter electronics; and
wherein determining the second value indicative of flow volume further comprises determining by a second meter electronics different than the first meter electronics.

12. A flow meter comprising:
a meter body that defines a central passage;
a first set of transducer pairs mechanically coupled to the meter body, the first set of transducer pairs comprising:
a first pair of transducers that define a first chord across the central passage at an upper elevation in the central passage;
a second pair of transducers that define a second chord across the central passage at an upper-middle elevation in the central passage, the second chord and the first chord non-planar;
a third pair of transducers that define a third chord across the central passage at a lower-middle elevation in the central passage, the third chord parallel to the first chord; and
a fourth pair of transducers that define a fourth chord across the central passage at a lower elevation in the central passage, the fourth chord parallel to the second chord;
a first memory device that stores a program;
a first processor electrically coupled to the first set of transducers pairs and the first memory, wherein the program, when executed by the processor, causes the processor to calculate a first value indicative of fluid flow through the central passage based on signals received by the first set of transducer pairs;
a second set of transducer pairs mechanically coupled to the meter body, the second set of transducer pairs comprising:
a fifth pair of transducers that define a fifth chord across the central passage at an upper elevation in the central passage;
a sixth pair of transducers that define a sixth chord across the central passage at an upper-middle elevation in the central passage, the fifth chord and the sixth chord non-planar;
a seventh pair of transducers that define a seventh chord across the central passage at a lower-middle elevation in the central passage, the seventh chord parallel to the fifth chord; and
a eighth pair of transducers that define a eighth chord across the central passage at a lower elevation in the central passage, the eight chord parallel to the sixth chord;
a second memory device that stores a program;
a second processor electrically coupled to the second set of transducers pairs and the second memory, wherein the program of the second memory device, when executed by the processor, causes the processor to calculate a second value indicative of fluid flow through the central passage based on signals received by the first second of transducer pairs;
the second processor and second set of transducer pairs operable to determine the second value indicative of the flow through the central passage when the first processor and any of the first set of transducer pairs are not in operation.

13. The flow meter of claim 12 further comprising at least one selected from the group consisting of: the first chord and fifth chord are at substantially the same elevation; the second chord and the sixth chord are at substantially the same elevation; the third chord and the seventh chord are at substantially the same elevation; and the fourth chord and the eighth chord are at substantially the same elevation.

14. The flow meter of claim 12 further comprising at least one selected from the group consisting of: the first pair of transducers and fifth pair of transducers are at substantially the same axial position; the second pair of transducers and the sixth pair of transducers are at substantially the same axial position; the third pair of transducers and the seventh pair of transducers are at substantially the same axial position; and the fourth pair of transducers and the eighth pair of transducers are at substantially the same axial position.

15. The flow meter of claim 12 wherein the first chord and fifth chord intersect within the central passage.

* * * * *

US007752919C1

(12) EX PARTE REEXAMINATION CERTIFICATE (9075th)
United States Patent
Straub, Jr. et al.

(10) Number: US 7,752,919 C1
(45) Certificate Issued: Jun. 12, 2012

(54) SYSTEM AND METHOD OF AN ACOUSTIC FLOW METER WITH DUAL FLOW MEASUREMENTS

(75) Inventors: Henry Charles Straub, Jr., Sugar Land, TX (US); Charles W. Derr, Spring, TX (US)

(73) Assignee: Daniel Measurement and Control, Inc., Houston, TX (US)

Reexamination Request:
No. 90/011,501, Feb. 21, 2011

Reexamination Certificate for:
Patent No.: 7,752,919
Issued: Jul. 13, 2010
Appl. No.: 12/169,685
Filed: Jul. 9, 2008

(51) Int. Cl.
*G01F 1/66* (2006.01)

(52) U.S. Cl. ............... 73/861.29; 73/861.27; 73/861.31
(58) Field of Classification Search ............... None
See application file for complete search history.

(56) References Cited

To view the complete listing of prior art documents cited during the proceeding for Reexamination Control Number 90/011,501, please refer to the USPTO's public Patent Application Information Retrieval (PAIR) system under the Display References tab.

*Primary Examiner* — Cameron Saadat

(57) ABSTRACT

Acoustic flow meter with dual flow measurements. At least some of the illustrative embodiments are flow meters comprising a spool piece that defines a central passage, a first plurality of transducer pairs mechanically coupled to the spool piece, a second plurality of transducer pairs mechanically coupled to the spool piece, and meter electronics electrically coupled to the first and second plurality of transducer pairs (the meter electronics configured to determine a first value indicative of fluid flow through the central passage, the first value determined using only signals of the first plurality of transducer pairs). The meter electronics further configured to determine a second value indicative of fluid flow through the central passage, the second value determined using only signals of the second plurality of transducer pairs.

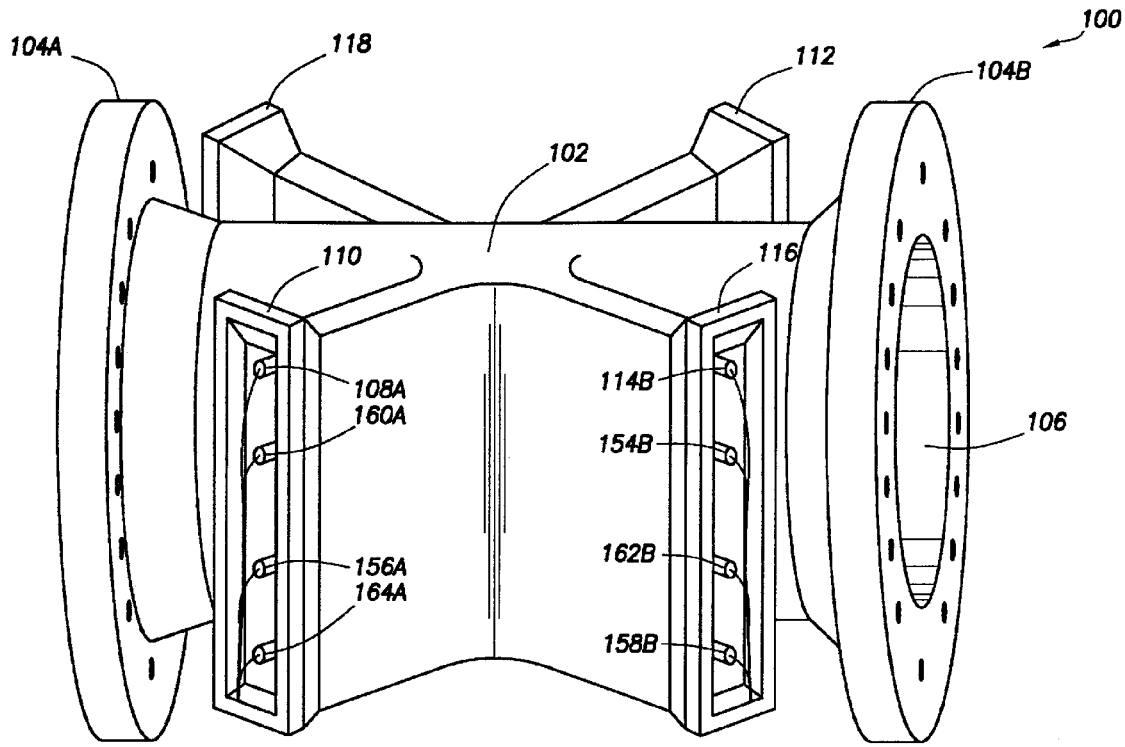

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 8-11 is confirmed.

Claims 1, 4 and 12 are determined to be patentable as amended.

Claims 2, 3, 5-7 and 13-15, dependent on an amended claim, are determined to be patentable.

New claim 16 is added and determined to be patentable.

1. A flow meter comprising:
a spool piece that defines a central passage;
a first plurality of transducer pairs mechanically coupled to the spool piece, each transducer pair defines a chord across the central passage, each transducer pair configured to propagate and receive acoustic signals along respective chords, and at least two chords of the first plurality of [transducers] *transducer* pairs are non-planar;
a second plurality of transducer pairs mechanically coupled to the spool piece, each transducer pair defines a chord across the central passage, each transducer pair configured to propagate and receive acoustic signals along respective chords, and at least two chords of the second plurality of [transducers] *transducer* pairs are non-planar; and
meter electronics electrically coupled to the first and second plurality of transducer pairs, the meter electronics configured to determine a first value indicative of fluid flow through the central passage, the first value determined using only signals of the first plurality of transducer pairs; and
the meter electronics further configured to determine a second value indicative of fluid flow through the central passage, the second value determined using only signals of the second plurality of transducer pairs.

4. The flow meter of claim 1 further comprising:
the first plurality of transducer pairs further comprises:
a first pair of transducers that define a first chord across the central passage at an upper elevation in the central passage;
a second pair of transducers that define a second chord across the central passage at an upper-middle elevation in the central passage, the second chord and the first chord non-planar;
a third pair of transducers that define a third chord across the central passage at a lower-middle elevation in the central passage, the third chord parallel to the first chord; and
a fourth pair of transducers that define a fourth chord across the central passage at a lower elevation in the central passage, the fourth chord parallel to the second chord;

the second plurality of transducer pairs further comprises:
a fifth pair of transducers that define a fifth chord across the central passage at an upper elevation in the central passage;
a sixth pair of transducers that define a sixth chord across the central passage at an upper-middle elevation in the central passage, the fifth chord and the sixth chord non-planar;
a seventh pair of transducers that define a seventh chord across the central passage at a lower-middle elevation in the central passage, the seventh chord parallel to the fifth chord; and
[a] *an* eighth pair of transducers that define a eighth chord across the central passage at a lower elevation in the central passage, the eight chord parallel to the sixth chord.

12. A flow meter comprising:
a meter body that defines a central passage;
a first set of transducer pairs mechanically coupled to the meter body, the first set of transducer pairs comprising:
a first pair of transducers that define a first chord across the central passage at an upper elevation in the central passage;
a second pair of transducers that define a second chord across the central passage at an upper-middle elevation in the central passage, the second chord and the first chord non-planar;
a third pair of transducers that define a third chord across the central passage at a lower-middle elevation in the central passage, the third chord parallel to the first chord; and
a fourth pair of transducers that define a fourth chord across the central passage at a lower elevation in the central passage, the fourth chord parallel to the second chord;
a first memory device that stores a program;
a first processor electrically coupled to the first set of transducers pairs and the first memory, wherein the program, when executed by the processor, causes the processor to calculate a first value indicative of fluid flow through the central passage based on signals received by the first set of transducer pairs;
a second set of transducer pairs mechanically coupled to the meter body, the second set of transducer pairs comprising:
a fifth pair of transducers that define a fifth chord across the central passage at an upper elevation in the central passage;
a sixth pair of transducers that define a sixth chord across the central passage at an upper-middle elevation in the central passage, the fifth chord and the sixth chord non-planar;
a seventh pair of transducers that define a seventh chord across the central passage at a lower-middle elevation in the central passage, the seventh chord parallel to the fifth chord; and
[a] *an* eighth pair of transducers that define a eighth chord across the central passage at a lower elevation in the central passage, the eight chord parallel to the sixth chord;
a second memory device that stores a program;
a second processor electrically coupled to the second set of transducers pairs and the second memory, wherein the program of the second memory device, when executed by the processor, causes the processor to calculate a second value indicative of fluid flow through the central passage based on signals received by the first second of transducer pairs;

the second processor and second set of transducer pairs operable to determine the second value indicative of the flow through the central passage when the first processor and any of the first set of transducer pairs are not in operation.

16. *The flow meter of claim 4 further comprising at least one selected from the group consisting of: the first pair of transducers and fifth pair of transducers at substantially the same elevation and different axial positions; the second pair of transducers and the sixth pair of transducers are at substantially the same elevation and different axial positions; the third pair of transducers and the seventh pair of transducers are at substantially the same elevation and different axial positions; and the fourth pair of transducers and the eighth pair of transducers are at substantially the same elevation and different axial positions.*

* * * * *